United States Patent Office 3,087,327
Patented Apr. 30, 1963

3,087,327
METHOD AND DEVICE FOR LOCATING LEAKS IN A HEAT EXCHANGER
Jakob Kägi, Winterthur, Switzerland, assignor to Sulzer Freres, S.A., Winterthur, Switzerland, a corporation of Switzerland
Filed July 8, 1960, Ser. No. 41,615
Claims priority, application Switzerland June 7, 1960
10 Claims. (Cl. 73—40.7)

The present invention relates to a method and an apparatus for locating leaks in a heat exchanger and is particularly useful in connection with heat exchangers used in nuclear power plants.

In nuclear power plants, the heat liberated in the reactor is removed by means of a first fluid which is usually a gas or a gas mixture. This reactor coolant transfers a part of its heat in a heat exchanger to a second fluid which may be a liquid which is vaporized and superheated in the heat exchanger. The pressure of the second fluid is usually higher than that of the reactor coolant and the obtained superheated vapor is usually used as operating medium for a turbine.

The heat exchanger includes a plurality of tubular sections through which the second fluid, i.e. the operating medium of a power plant, flows in parallel relation. The tubes of the heat exchanger may develop leaks after longer periods of operation so that a portion of the vaporized operating medium may enter into the gas which is used for cooling the reactor. The individual tubular sections are, therefore, usually provided with valves so that the individual sections or groups thereof where leaks are suspected can be closed. Presence of the second operating medium, which is usually water or steam, in the reactor coolant may cause damage to the nuclear reactor, for example by corrosion, and it is important that development of a leak in the tubular heat transfer elements of the heat exchanger be discovered immediately and the respective tube section be closed off before damage occurs.

It is an object of the present invention to provide a method and an apparatus for immediately discovering and locating leaks in a heat exchanger of the aforesaid type. The method according to the invention provides adding a tracer substance to the second heat exchange fluid upon discovery of traces of the second fluid in the first fluid so that the tube section in whose surroundings the first fluid contains the relatively highest concentration of tracing substance can be quickly found and closed off.

The apparatus according to the invention includes suction means which are individually placed in the vicinity of or adjacent to the tube sections of the heat exchanger at a locality where the first heat exchange fluid leaves the heat exchanger. A device for indicating the presence of second fluid in the first fluid is connected to each suction means. Each tube section is provided with means for adding a tracer substance to the fluid which flows in the tube section and said suction means are individually connectable to a device for measuring the concentration of the tracer substance in the fluid withdrawn by the individual suction means.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

Figure 1:
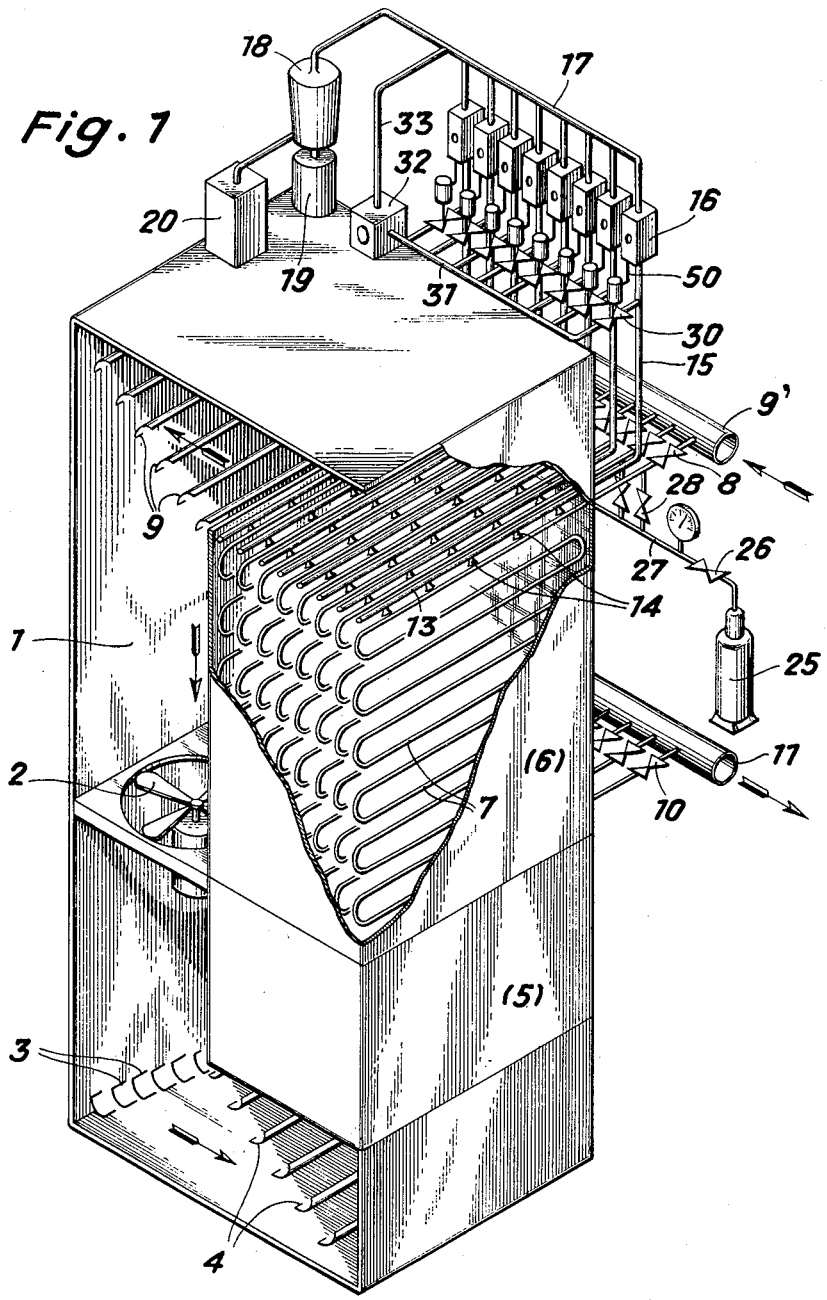
FIG. 1 is a diagrammatic perspective illustration of a nuclear reactor combined with a heat exchanger which is provided with the apparatus according to the invention, parts of the casing of the heat exchanger being removed.

Referring more particularly to FIG. 1 of the drawing, a gaseous coolant is blown through a duct 1 by means of a fan 2 and directed by means of guides 3 and 4 through a reactor 5 and therefrom through a heat exchanger 6 and directed back into the duct 1 by means of guide vanes 9. The gas absorbs heat in the reactor 5 and delivers the heat in the heat exchanger 6 to an operating medium flowing in parallel relation through a plurality of tubular heating sections 7. The latter are individually placed in vertical planes. The inlets of the sections 7 are connected to a distributor 9', a stop valve 8 being provided in the inlet of each tube section. The tube sections 7 terminate in a collector or header 11, a stop valve 10 being provided in each tube section adjacent to the header 11. On top of each tube section 7 a test tube 13 is arranged which is provided with a plurality of suction devices 14. Each test tube 13 is connected by means of a pipe 15 to a humidity measuring device 16. Each device 16 has an outlet which is connected to a collecting pipe 17, the latter terminating in the inlet of a blower 18 driven by a motor 19. The blower 18 returns the fluid in the tube 17 through a purifying device 20 to the duct 1.

A tracer substance, for example an amine, is stored under pressure in a container 25. The latter is connected through a reducing valve 26 to a distributing pipe 27. This pipe is connected to the inlet of each of the tube sections 7, downstream of the valves 8, by means of valves 28.

The tubes 15 which are individually connected to the test tubes 13 are connected not only to the humidity measuring devices 16 but also to a common pipe 31. A valve 30 controllable by a solenoid is interposed in each connection between a pipe 15 and the pipe 31. The pipe 31 terminates in a detector 32 for detecting the presence of tracer substance in the fluid arriving through the pipe 31. The detector 32 is provided with an outlet which is connected by means of a pipe 33 to the collecting pipe 17.

If one of the tube sections 7 develops a leak, vaporizable second fluid enters the gaseous first fluid and is drawn through one or more of the suction openings 14 into one or more test tubes 13 so that the respective humidity measuring devices are actuated. Thereupon the respective valves 30 and 28 are consecutively opened and closed. The detector 32 which reacts to small amounts of the tracer substance added to the fluid entering the tube sections 7 and present in the fluid outside of and adjacent to a leak in a tube section, clearly indicates which of the involved tube sections is leaking. By closing the respective valves 8 and 10, the respective tube section will be closed so that the humidity measuring devices 16 all indicate the same relatively low humidity.

The apparatus according to the invention immediately discovers that there is a leak and simultaneously roughly indicates the locality of the leak so that the number of tube sections which must be tested to ascertain the section which is leaking can be held very small. When testing with the tracer substance, the concentration of the latter is relatively high, because the first fluid is withdrawn only through the test tube which is in the vicinity of the leaking tube section.

The apparatus according to the invention may be automatically operated. For example, the solenoid controlled valves 30 may be individually connected to the hygrometers 16 by means of signal conductors 50. Whenever moisture is found in the gaseous first fluid by one or more of the humidity measuring devices 16, the valves 28 which are at the inlet of the tube sections in the neighborhood of which moisture has been detected are opened and closed, one after the other, to successively admit some tracer substance from the container 25. This may be done by conventional control devices connected to the conductors 50. Thereupon the respective valves 30 are opened, one after the other and individually after opening of the respective valves 28 to successively admit samples of the first fluid from locations individually adjacent to the involved tube sections to the detector 32. The latter may include a registering device which shows the positions of the valves 28 and 30 and also the concentration of the tracer substance in the pipe 31 so that it can be immediately seen which of the tube sections has a leak. The detector 32 may actuate means for automatically closing the inlet valves 8 and the outlet valves 10 of the tube sections in whose surroundings the tracer substance concentration exceeds a predetermined value.

Instead of a plurality of test tubes 13, a single test tube may be provided which has one or more suction openings and which can be moved from one tube section to the other. If the test tube has only one suction device connected thereto, this device must be moved alongside the top portion of one tube section until the test tube is transferred to the next tube section in order to find the locality where there is the highest humidity. Means may be provided to stop movement of the test tube after finding the location of highest humidity. Thereupon the tracer fluid is added to the respective tube sections, one after the other, until the detector indicates the presence of tracer substance. The aforedescribed scanning operation has the advantage that the suction device will be brought into the region of highest concentration of the tracer substance so that the detector 32 need not be very sensitive.

Figure 2:
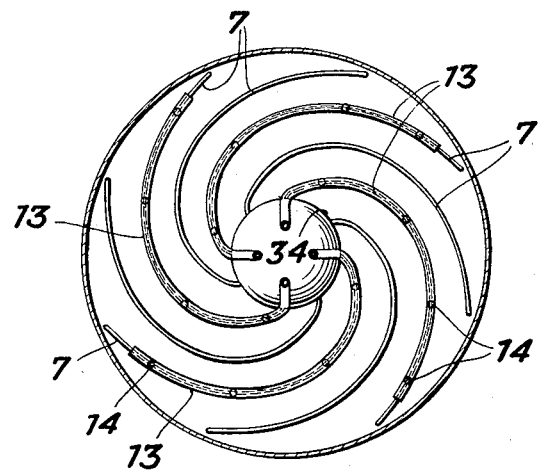
FIG. 2 is a diagrammatic top view of a modified heat exchanger equipped with suction means forming part of a leak-discovering apparatus according to the invention.

FIG. 2 illustrates the application of the apparatus according to the invention to a heat exchanger of circular cross section. In order to obtain uniform spacing of the tube sections, the inlets of the tube sections 7 are connected to a header 34 which is located in the axis of the heat exchanger and the tube sections are bent to form evolvents. The test tubes 13 are shaped to follow the top of the tube sections.

Figure 3:
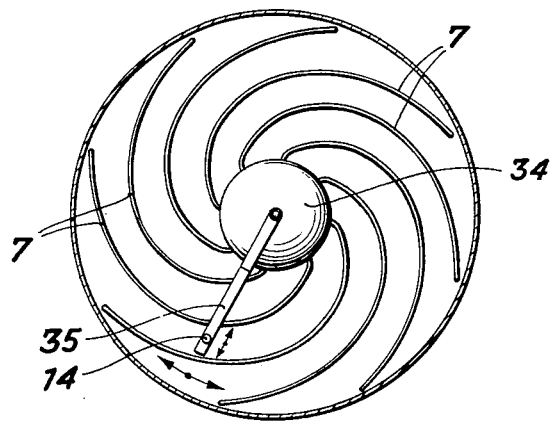
FIG. 3 is a diagrammatic top view of the heat exchanger shown in FIG. 2 equipped with a modified suction means.

Instead of providing a test tube for each tube section, a single test tube 35 extending radially and revolvable around the axis of the cylindrical heat exchanger may be provided. This test tube has a radially displaceable suction inlet 14. This scanning device is illustrated in FIG. 3.

It is not necessary that in the arrangements in which the test tubes are stationary each tube section is provided with a test tube; for example, a test tube 13 may be provided for every other of the tube sections 7 as is shown in FIG. 2.

I claim:

1. Method of locating a leak in a tubular heat exchanger wherein a first heat exchange fluid flows at relatively low pressure on the outside of tube sections through which flows a relatively high pressure second heat exchange fluid in parallel relation, the method including the steps of sampling said first fluid to detect traces of the second fluid in the first fluid, adding a tracing substance to the second fluid, and sampling said first fluid flowing adjacent to said individual tube sections to detect the tube section in whose surroundings the first fluid contains the relatively highest concentration of tracing substance.

2. The method defined in claim 1 wherein said tracing substance is added consecutively and separately to the fluid flowing through the individual tube sections.

3. Method of locating a leak in a tubular heat exchanger wherein a first heat exchange fluid flows at relatively low pressure on the outside of tube sections through which flows a relatively high pressure second heat exchange fluid in parallel relation, the method including the steps of sampling said first fluid at different localities adjacent to said tube sections to detect traces of the second fluid in the first fluid and to detect the locus where there is the relatively highest concentration of the second fluid in the first fluid, adding a tracing substance consecutively to the second fluid flowing through the tube sections which are adjacent to said locus, and measuring the concentration of said tracing substance in the first fluid at the environment of said locus for locating the leaking tube section.

4. In a heat transfer apparatus, a duct for conducting a relatively low pressure first heat exchange fluid, a plurality of tube sections placed in said duct and conducting a relatively high pressure second heat exchange fluid in parallel relation, at least one suction means disposed adjacent to the outside of each one of a plurality of said tube sections for drawing-in first heat exchange fluid, separate means connected to each of said suction means for detecting traces of said second fluid in said first fluid, means connected to each one of said tube sections for introducing a tracer substance thereinto, and a detector separately connectable to each one of said suction means for detecting tracer substance contained in the first fluid which is drawn-in by said suction means.

5. In a heat transfer apparatus as defined in claim 4 and wherein each of said suction means is in the form of a tube having apertures extending in the direction of flow of said first fluid.

6. In a heat transfer apparatus as defined in claim 4 and wherein at least one of said suction means is movable transversely to the direction of flow of said first fluid.

7. In a heat transfer apparatus as defined in claim 4 and wherein the individual tube sections extend in the flow direction of the first fluid.

8. In a heat transfer apparatus according to claim 7 and wherein the individual tube sections are arranged in planes which are parallel to the flow direction of the first fluid.

9. In a heat transfer apparatus according to claim 7 and wherein said suction means are placed downstream of the respective tube sections, with respect to the flow direction of the first heat exchange fluid.

10. Method of locating a leak in a tubular heat exchanger wherein a first heat exchange fluid flows at relatively low pressure on the outside of tube sections through which flows a relatively high pressure second heat exchange fluid in parallel relation, the method including the steps of individually sampling said first fluid flowing adjacent to the individual tube sections to detect the tube sections adjacent to which there is a relatively high concentration of the second fluid in the first fluid, thereupon adding a tracing substance consecutively and separately to the fluid flowing through the tube sections adjacent to which a relatively high concentration of the second fluid has been detected, and sampling said first fluid flowing adjacent to the tube sections conducting fluid whereto a tracing substance has been added to detect the tube section adjacent to which the first fluid contains the relatively highest amount of tracing substance.

References Cited in the file of this patent

UNITED STATES PATENTS 2,947,166 Palmer et al. _____ Aug. 2, 1960

OTHER REFERENCES

Bulletin #CEC–1801B of Consolidated Engineering Corporation, 620 N. Lake Ave., Pasadena 4, Calif., entitled "Consolidated Leak Detector Model 24–101A," 14 pp., copy in 73—40.7.